US011640713B2

(12) United States Patent
López Felip et al.

(10) Patent No.: US 11,640,713 B2
(45) Date of Patent: *May 2, 2023

(54) COMPUTING SYSTEM AND A COMPUTER-IMPLEMENTED METHOD FOR SENSING GAMEPLAY EVENTS AND AUGMENTATION OF VIDEO FEED WITH OVERLAY

(71) Applicant: Optima Sports Systems S.L., Sant Joan Despi (ES)

(72) Inventors: Maurici A. López Felip, Sant Joan Despi (ES); Henry S. Harrison, Sant Joan Despi (ES)

(73) Assignee: OPTIMA SPORTS SYSTEMS S.L., Sant Joan Despi (ES)

( * ) Notice: Subject to any disclaimer, the term of this patent is extended or adjusted under 35 U.S.C. 154(b) by 10 days.

This patent is subject to a terminal disclaimer.

(21) Appl. No.: 17/388,320

(22) Filed: Jul. 29, 2021

(65) Prior Publication Data
US 2022/0038643 A1 Feb. 3, 2022

Related U.S. Application Data

(60) Provisional application No. 63/058,035, filed on Jul. 29, 2020.

(51) Int. Cl.
*H04N 5/272* (2006.01)
*G06V 20/40* (2022.01)
(Continued)

(52) U.S. Cl.
CPC ........... *G06V 20/41* (2022.01); *G06F 18/22* (2023.01); *G06T 7/20* (2013.01); *G06T 7/70* (2017.01);
(Continued)

(58) Field of Classification Search
None
See application file for complete search history.

(56) References Cited

U.S. PATENT DOCUMENTS

| 8,698,874 B2 | 4/2014 | Watson et al. |
| 2007/0061735 A1* | 3/2007 | Hoffberg .............. G06V 40/103 715/744 |
| 2008/0192116 A1 | 8/2008 | Tamir et al. |
| 2011/0302003 A1* | 12/2011 | Shirish .............. G06Q 10/0639 705/7.38 |

(Continued)

FOREIGN PATENT DOCUMENTS

| EP | 2396767 A2 | 12/2011 |
| WO | 2010091875 A2 | 8/2010 |

(Continued)

OTHER PUBLICATIONS

Ahmed Azough et al. "Description and Discovery of Complex Events in Video Surveillance", Third International Workshop on Semantic Media Adaptation and Personalization, IEEE Computer Society, 2008, pp. 27-32.

(Continued)

*Primary Examiner* — Eileen M Adams
(74) *Attorney, Agent, or Firm* — Hassan Abbas Shakir; Shakir Law PLLC

(57) ABSTRACT

A computer-implemented method and computing system for sensing gameplay events and optionally and preferably augmenting a video feed with overlay, comprising in some embodiments a data acquisition module, a sensor module, and optionally and preferably an overlay module. By describing the state of gameplay with models that capture the semantics of the game and comparing this description to a library of event patterns using one or more pattern matchers defining different ways of evaluating criteria, occurrences of events are detected. Detected events are processed by the overlay module to generate video feed augmented with overlay illustrating said events.

19 Claims, 5 Drawing Sheets

(51) Int. Cl.
  *G06V 20/52* (2022.01)
  *G06V 40/20* (2022.01)
  *G06T 7/70* (2017.01)
  *G06V 40/10* (2022.01)
  *G06T 7/20* (2017.01)
  *G06T 11/00* (2006.01)
  *G06F 18/22* (2023.01)
  *G06Q 10/0639* (2023.01)
  *G06Q 10/10* (2023.01)

(52) U.S. Cl.
  CPC ............. *G06T 11/00* (2013.01); *G06V 20/42* (2022.01); *G06V 20/53* (2022.01); *G06V 40/10* (2022.01); *G06V 40/20* (2022.01); *H04N 5/272* (2013.01); *G06Q 10/0639* (2013.01); *G06Q 10/10* (2013.01); *G06T 2207/10016* (2013.01); *G06T 2207/20072* (2013.01); *G06T 2207/30196* (2013.01); *G06T 2207/30221* (2013.01); *G06T 2207/30241* (2013.01); *G06T 2210/62* (2013.01); *G06V 20/44* (2022.01)

(56) References Cited

U.S. PATENT DOCUMENTS

2019/0022487 A1* 1/2019 Joo ................... A63B 24/0021
2019/0205652 A1   7/2019 Ray et al.
2019/0318651 A1* 10/2019 Fenyvesi ................. G07C 1/28

FOREIGN PATENT DOCUMENTS

WO   2015151095 A1   10/2015
WO   2019141813 A1   7/2019

OTHER PUBLICATIONS

Cheng-Chang Lien et al. "Scene-based event detection for baseball videos", Journal of Visual Communication & Image Representation, ScienceDirect, 2007, vol. 18, pp. 1-14.
Manuel Stein et al. "Bring it to the Pitch: Combining Video and Movement Data to Enhance Team Sport Analysis", IEEE Transactions on Visualization and Computer Graphics, Jan. 2018, vol. 24, No. 1, pp. 13-22, XP011673894.

* cited by examiner

COMPUTING SYSTEM AND A COMPUTER-IMPLEMENTED METHOD FOR SENSING GAMEPLAY EVENTS AND AUGMENTATION OF VIDEO FEED WITH OVERLAY

CROSS REFERENCE TO RELATED APPLICATIONS

This application claims priority to U.S. Provisional Application No. 63/058,035, filed Jul. 29, 2020. The entire contents of the above application are hereby incorporated by reference in their entirety.

TECHNICAL FIELD

The present disclosure relates to the field of computing devices and systems. More specifically, it relates to devices, systems and methods that enable at least one of communication, instruction, and demonstration of patterns occurring in an event like a sport event via automatic detection and generation of video feed with overlay characterizing those patterns.

BACKGROUND OF THE DISCLOSURE

A variety of technologies have been used to measure and analyze sports performance driven by gameplay data. In general sports data analysis has not been able to capture the rich performance analysis that an expert coach is able to provide but have complemented the process in various ways. The utility of these applications has varied depending on the relationship of the data to the gameplay and to the complexity of the human process it is complementing. Purposes of sports data analysis can include fan engagement, resolution of gambling contracts, injury prevention and healing, and performance improvement.

Existing technologies for data collection in sports include, among others, motion capture systems. These types of technologies allow to record movement and track objects and people in performance environments. Known methods include video capture, for example the method disclosed in U.S. Patent Application 2008/0192116 A1.

Methods are also known for facilitating the annotation of video by skilled human observation. The resulting output data set consists of ordered sequences of observations corresponding to discrete actions occurring in the gameplay (e.g., goals, shots, etc.). This data set may be transmitted with the video or used for video editing, such as cutting and labeling clips.

There are techniques known in the academic literature to link player tracking data sets to specific gameplay concepts (e.g. team formation in Atmosukarto, Ghanem, Saadalla, and Ahuja, 2014, "Recognizing Team Formation in American Football", doi:10.1007/978-3-319-09396-3_13; pressure in Andrienko, Adrienko, Budziak, von Landesberger, and Weber, 2017, "Exploring pressure in football", doi:10.1145/3206505.3206558; expected goals in Macdonald, 2012, "An Expected Goals Model for Evaluating NHL Teams and Players", MIT Sloan Sports Analytics Conference 2012). These analyses are typically statistical or technical in nature and therefore the value of communicating/instructing/coaching them to sports participants is minimal. There is lacking a systematic method for integrating analyses (both novel and previously known) in order to generate content such as video feeds by means of automatic analysis and representation.

Another common workflow is to use human intervention to manually provide the desired information. In this regard, the innovations have been focused on improving the tools that allow users to conveniently annotate time points in a match or training for future review in the form of video clips. With these tools, the workflow of the coaching staff is aided more by data input than by data analysis.

Despite these improvements in the user experience and functionalities of annotation tools, these methods have several limitations. First, they require a large number of highly trained personnel to annotate all relevant moments of a sporting event. Second, this process takes significant time, reducing the opportunity to generate value from the outputs. Third, the output is in the form of labeled clips and requires additional effort to provide more communicative output such as videos with illustrative overlays (drawings or telestrations superimposed on the video).

In summary, a gap exists between the use of data analytics in football, and the actual working practices of coaching staffs. Data analytics has tended to provide different solutions than the ones coaches, their staffs, and other roles concerned with sports analysis, are looking for. Thus, instead of leveraging methods involving data, coaches rely on manual methods. It would therefore be advantageous to provide a solution that would overcome the deficiencies noted above.

SUMMARY

Computing systems and computer-implemented methods as described in the present disclosure are intended for sensing gameplay events and, optionally and preferably, augmentation of video feed with overlay.

A first aspect of the disclosure relates to a computer-implemented method that comprises: a data acquisition step, and an event sensing step.

The data acquisition step comprises the acquiring of sporting event data that includes but is not necessarily limited to positional data by collection, generation, transfer, or other means. In some embodiments, the data acquisition step further comprises the acquisition of video of the sporting event during a period of time that overlaps with positional data timesteps. In some embodiments, the data acquisition step further comprises the acquisition of one or more homographies. A homography is a mapping between two coordinate systems; in the context of this disclosure, it maps between the coordinate system of the real-world field of play in physical units such as meters, and the coordinate system of video acquired during the data acquisition step. In some embodiments, the data acquisition step further comprises the acquisition of metadata. Metadata describes any characteristic of the sporting event or its participants that may be known by any means prior to observation of the sporting event (e.g., performance characteristics of the participants during previous sporting events).

When describing subsequent steps, "sporting event data" or the unqualified term "data" may refer to any part or the entirety of the data acquired during the data acquisition step.

In some embodiments, the data acquisition step includes a video capture step during which video is collected to use as input for computer vision tracking steps. Alternatively, or additionally, in some embodiments, the data acquisition step comprises the collection of data from one or more third-party data providers, that is to say, the data acquisition step includes the reception of data by means of wired or wireless communications, including by means of a data connection on the Internet. In some embodiments of the disclosure, the data acquisition step includes a series of computer vision steps.

The event sensing step comprises the processing of data for the purposes of detecting the occurrence of gameplay events during the sporting event. Gameplay events are observable actions during a sporting event at any level of analysis. Basic gameplay scenarios, such as corner kicks, goal kicks, and free kicks in association football, are events, as are higher level tactical behaviors such as off-ball supporting movements. For the purposes of the disclosure, events can include but are not limited to physical events, technical events, gameplay events, tactical events, and strategic events. When describing subsequent steps, the unqualified term "event" refers to a gameplay event rather than a sporting event.

In some embodiments of the disclosure, the event sensing step comprises: a description step and an event detection step.

In some embodiments of the disclosure, the description step comprises the execution of a model graph, where a model graph is a set of mathematical models or algorithms of any variety, possibly a heterogeneity of types of models, connected to each other by their dependency relations. That is, if the output of a model is required as an input to another, these models are connected in the graph. The models and their dependency relations form a directed graph. One or more models use as input the data acquired during the data acquisition step, and therefore form a start of the graph. During the description step, the models in the model graph are evaluated respecting the dependencies of each model, such that no model is evaluated until all its dependencies, or required inputs, are available. In some embodiments, the model outputs correspond to descriptions of the sporting event in conceptual terms understood by subject-matter experts.

In some embodiments of the disclosure, the event detection step comprises the detection of gameplay events by comparison of outputs of the model graph with criteria in a pattern library. Every entry in the pattern library describes the pattern corresponding to a type of gameplay event in terms of criteria defined over output values of a subset of models in the model graph. The pattern library comprises a plurality of patterns; in this sense, in some embodiments, the method comprises populating the pattern library with a plurality of patterns, either prior to or during the event detection step. The population of the pattern library can be by introducing the patterns with user input means, in which case the user (for example but without limitation, a subject-matter expert) introduces the patterns in the library, or by downloading the patterns to the pattern library from a remote server or database via a wired or wireless connection. In some embodiments, entries in the pattern library also contain criteria for assigning roles to individuals involved in the gameplay event. In some embodiments, these entries may include specific steps for determining spatial information such as relevant gameplay areas as a function of the data corresponding to the time of the event.

In some embodiments of the disclosure, the outputs of the event detection step are event records. In some embodiments, each event record includes one, some or all of an event identifier, start and end times, a set of individuals identified by roles, and relevant spatial information.

In some embodiments, the method further comprises a tactical camera creation step, which uses positional data to create a virtual moving camera that follows the action of the sporting event, zooming in to the extent possible while leaving all or most of the participants visible. The resulting video may be referred to as a tactical camera video, action camera video, or virtual camera video. The tactical camera creation step also modifies the homographies such that the mapping of each video frame is correct given the new camera view.

In some embodiments, the method further comprises an overlay generation step after the event sensing step. In the overlay generation step, the homographies and event records are used to draw graphical overlays on the video by means of mapping tracking data (of individuals identified by role in the event record) and spatial information contained in the event record to video coordinates by the homographies. Graphical overlays comprise graphical elements superimposed on the original video feed that illustrate, highlight, or emphasize some aspect of the gameplay and are also referred to as telestrations (in the case of these embodiments of the disclosure, automatic telestration). In embodiments that include a tactical camera creation step, the input video may be the tactical camera video; otherwise, it may be the video output by the data acquisition step. The result of the overlay generation step is one or more augmented videos.

Aspects and embodiments of the present disclosure here allow, based on the heterogeneous algorithms set of the model graph, one or more of the following, for a series of advantageous functionalities in respect to the prior-art. First, automatic detection of patterns of play in the sporting event; that are of direct interest for the coach and others—in lieu of traditional statistical trends or numeric values that require interpretation. Second, it allows for automatic classification of the patterns based on data revealed in the process of the detection (e.g., the players involved, location on the field of play, type) and/or attributes of the type of event (e.g., formation, offensive or defensive tactical fundamentals, etc.). And thirdly, it allows for automatic graphic representation for each pattern detected and generated in an augmented video which communicates the nature of the pattern. Such video has value for purposes such as performance enhancement, review, and improvement; tendency analysis for understanding opponents; education and training of tactical principles; and content-generation for media and direct fan consumption. Further, it may do so in a way constrained by computational processing capacity rather than human attentional capacity, and with objective analysis. These innovations allow for sporting events to be analyzed more quickly, in greater width and depth, and in parallel, compared to previous methods, saving time and resources of analysts while increasing the level of engagement with the content. Therefore, the present aspects and embodiments improve the efficiency, efficacy, and cost-effectiveness of content generation, communication of gameplay event characteristics, and performance review and improvement for any type of sports organization.

A second aspect of the disclosure relates to a computing system for sensing gameplay events and augmentation of video feed with overlay that comprises a data acquisition module and a sensor module. The computing system has at least one processor and at least one memory for implementation of modules comprised in the system. The data acquisition module is a device or component configured to carry out the data acquisition step as previously described. Similarly, the sensor module is a device or component configured to carry out the event sensing step previously described. In some embodiments, a tactical camera module is a device or component configured to carry out the tactical camera creation step. Some embodiments further comprise an overlay module configured to perform the overlay generation step.

In some embodiments, the data acquisition module includes a video capture module configured to execute the video capture step, and a computer vision tracking system configured to execute computer vision tracking steps.

In some embodiments, the sensor module contains a description module and an event detector module.

In some embodiments, the description module comprises a representation of one or more model graphs and a model graph execution module configured to evaluate the model graphs as previously described.

In some embodiments, the event detection module comprises a pattern library and a pattern matcher module configured to evaluate the criteria defined in the pattern library as previously described.

A third aspect of the disclosure relates to a computer-implemented method comprising:
digitally processing video footage from a sporting event in order to:
  register coordinates of the video footage and estimate coordinates of an area-of-play of the sporting event as appearing in the video footage, and thereby provide a homography mapping between both coordinates; and
  detect players in each frame of the video footage, associates the detected players between adjacent frames, and use both the associated detection of the players and the homography mapping to output a dataset with positional data of the players and/or trajectories of the players;
digitally processing a collection of models associated with the sporting event in order to:
  construct a vector model graph with the models in the collection;
  input at least part of the dataset into the vector model graph for evaluation thereof;
  construct, based on the evaluated vector model graph, a subset of spatial models into a graph for each group of N frames of the video footage, with the video footage at least comprising N frames; and
  input at least part of the dataset into the graph of the subset of spatial models for evaluation thereof, thereby providing spatial model evaluation outputs;
digitally processing pattern definitions in a pattern library associated with the sporting event in order to:
  compare each pattern definition with each spatial model evaluation output; and
  output an event record for each spatial model evaluation output that fulfills the pattern definition, the event record including data at least indicative of an event of the pattern definition, and start and end times that the pattern definition is fulfilled according to respective start and end frames of the video footage.

In some embodiments, each model in the collection is configured to take as input at least one of: positional data of players of the sporting event, and an output of one or more other models in the collection; wherein each pattern definition includes data at least indicative of a rule defining conditions in terms of inequality relationships defined over outputs from a model graph; wherein at least one model in the collection is configured to take the positional data as input.

In some embodiments, the data of each pattern definition is at least further indicative of:
one or more rules mapped from a role of the players of the sporting event, each rule defining at least one condition in terms of outputs from the model graph for determining fulfillment of the rule by the player; and
a mapping of player roles to glyph specifications, where glyphs are visual elements in the video footage; and
the data of the event record is at least further indicative of one or more player role assignments according to the fulfillment of the one or more rules of the pattern definition.

In some embodiments, the video footage is a first video footage, and the method further comprises:
digitally processing the first video footage in order to output second video footage comprising the first video footage with glyphs digitally added thereto, wherein the glyphs are at least added in the video footage according to one or more pattern definitions that are fulfilled, the glyphs being added between respective start and end frames of each pattern definition that is fulfilled and on the player or players in the player role assignment or assignments indicated on the event record, wherein the glyphs are determined by the mapping of player roles to glyph specifications, and wherein the digital processing adds the glyphs in the video footage by applying a reverse of the homography mapping.

In some embodiments, the method further comprises: capturing the video footage with a camera on a venue of the sporting event; or receiving the video footage from a computing device or a video camera as a data transmission.

In some embodiments, the step of digitally processing the video footage from the sporting event to provide the homography mapping and the dataset comprises at least one of:
digitally processing two or more video footages of the same sporting event captured with different perspectives, the two or more video footages comprising the video footage; and
digitally processing the video footage and measurements of one or more position measuring sensors arranged on at least some players of the sporting event; and the two or more video footages and/or the measurements are digitally processed to provide the homography mapping and the dataset.

In some embodiments, the collection of models is represented as a directed acyclic graph, with both each model being a node in the graph and each edge in the graph representing a dependency relationship pointing from one model to another model whose output is required as an input to the first model.

In some embodiments, the digital processing of the collection of models is such that the digital processing evaluates the collection of models by:
traversing the directed acyclic graph of models in depth-first order, and
reversing the resulting order such that the model traversed last is evaluated first, the model traversed first is evaluated last, and so on.

In some embodiments, the models are classified in two categories: vector models configured to evaluate all timesteps of a sample of the sporting event simultaneously, and spatial models that are executed timestep-by-timestep; wherein the digital processing of the collection of models is such that the digital processing further:
evaluates the directed acyclic graph of the subset of the models that are vector models;
evaluates, at each timestep during the timestep-by-timestep evaluation of pattern definitions of the pattern library, whether the event (of a potential event record)

is potentially active or not during said timestep according to a comparison parameter included in a respective pattern definition;

adds, in case the evaluation indicates that the event is potentially active, one or more spatial models defined in a respective pattern definition to a collection of spatial models for the respective timestep;

constructs a directed acyclic graph of models based on both all the spatial models and dependencies thereof, evaluates the spatial models in the directed acyclic graph of models respecting the dependencies thereof, thereby providing the spatial model evaluation outputs.

In some embodiments, the method further comprises additional steps as described with reference to the first aspect of the disclosure.

A fourth aspect of the disclosure relates to a computing system comprising: at least one processor, and at least one memory; the at least one memory comprising instructions which, when executed by the at least one processor, cause the computing system to at least perform the method according to the first or third aspect of the present disclosure.

In some embodiments, the at least one memory further comprises a collection of models associated with a sporting event, and a pattern library with pattern definitions associated with the sporting event.

In some embodiments, the computing system further comprises at least one of: a video camera configured to capture the video footage, and a wired or wireless communications module configured to receive the video footage from a computing device or a video camera.

In some embodiments, the computing system comprises a plurality of video cameras adapted to capture the two or more video footages, and/or the one or more positions measuring sensors.

A fifth aspect of the disclosure relates to a data processing apparatus comprising at least one processor adapted to perform a method according to the first or third aspect of the disclosure.

A sixth aspect of the disclosure relates to a computer program product that has instructions which, when executed by a computing device or system, cause the computing device or system to perform a method according to the first or third aspect of the disclosure.

Upon running the computer program product on one or more processors of the computing device or system, the computing device or system senses gameplay events and, optionally and preferably, augments video feed with overlay.

In some embodiments, the computer program product is embodied on a non-transitory computer-readable medium or a computer-readable data carrier has the computer program product stored thereon.

A seventh aspect of the disclosure relates to a data carrier signal carrying a computer program product according to the sixth aspect of the disclosure.

The advantages of the first and second aspects of the disclosure may likewise apply to the third, fourth, fifth, sixth and seventh aspects of the disclosure.

DETAILED DESCRIPTION

Figure 1:
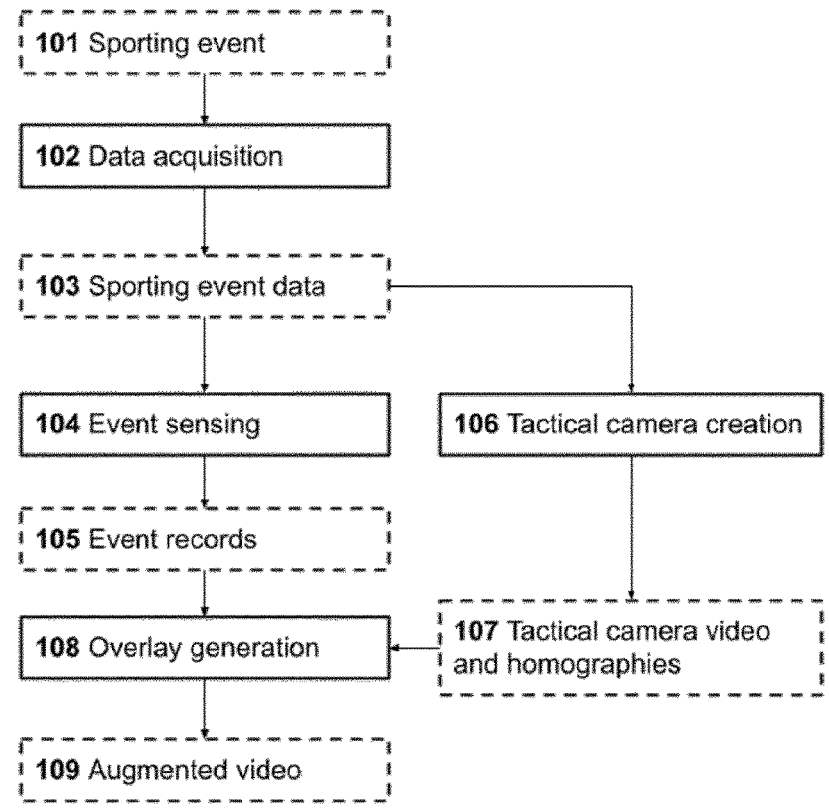
FIG. 1. A flowchart illustrating the steps (solid outlines) and input/outputs (dashed outlines) in embodiments of the disclosure.
Figure 2:
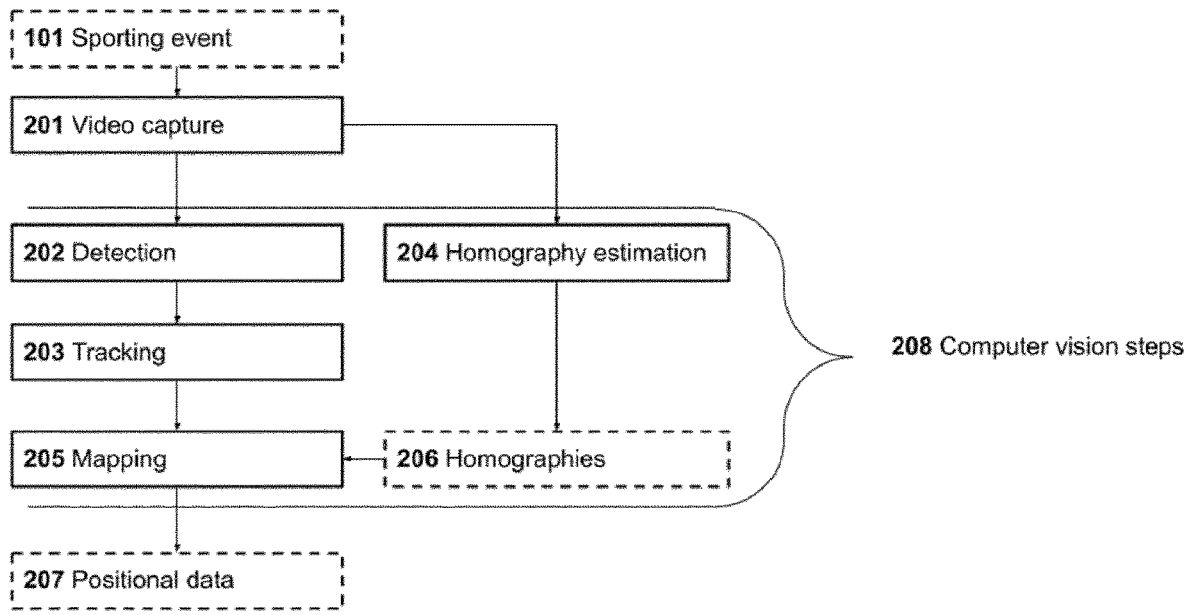
FIG. 2. A flowchart illustrating the substeps of the data acquisition step in embodiments of the disclosure.
Figure 3:
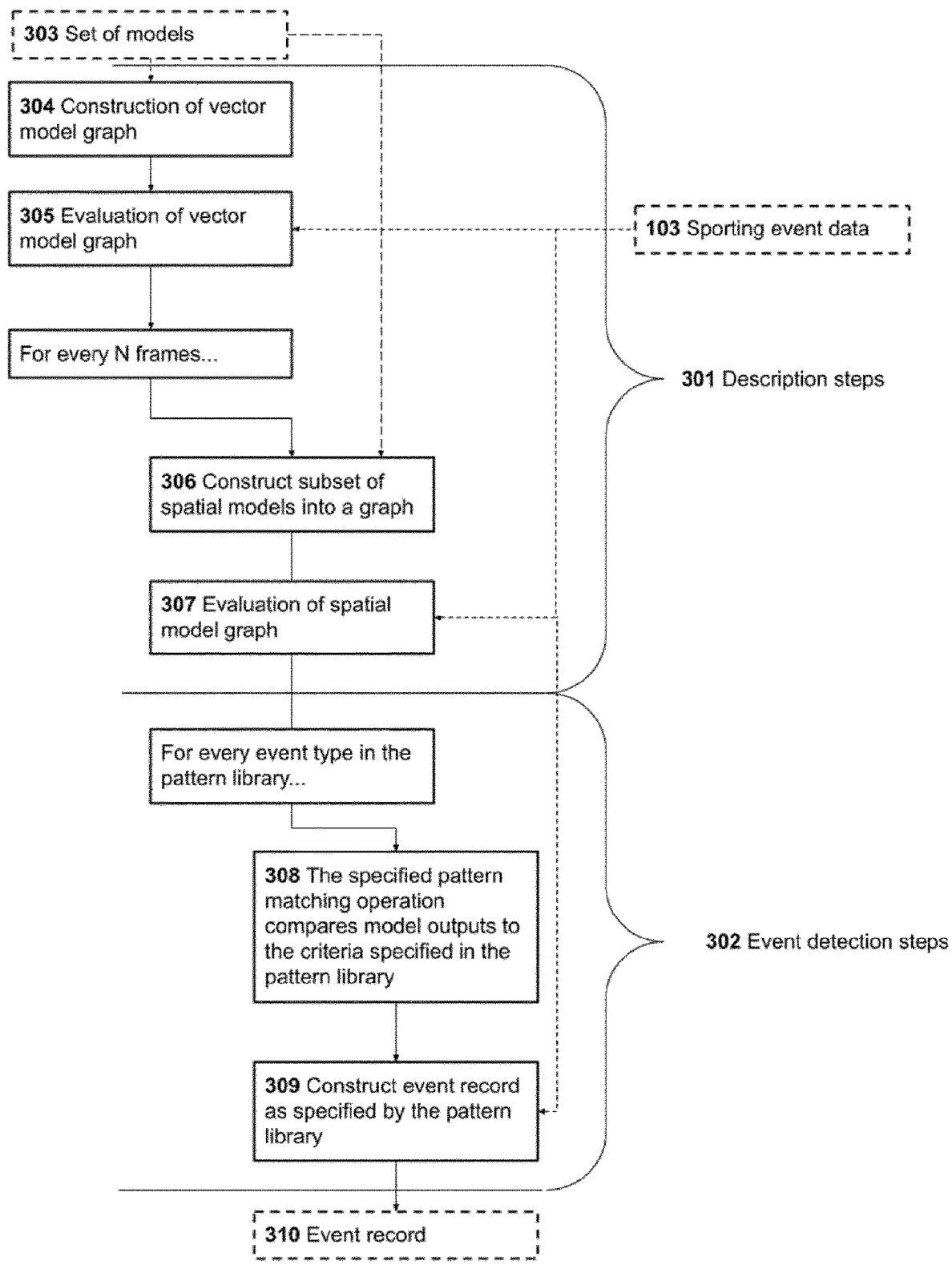
FIG. 3. A flowchart illustrating the substeps of the event sensing step in embodiments of the disclosure.

With reference to the drawings, particularly FIGS. 1-3, a computing system and computer-implemented method for sensing gameplay events and augmentation of video feed with overlay will now be described.

FIG. 1 illustrates the steps of some embodiments of a method for sensing gameplay events and augmentation of video feed with overlay. Steps are shown with solid outlines and intermediate products of the steps are shown with dashed outlines, as with FIG. 2 as well. Minimally, the method comprises a data acquisition step 102, comprising the acquisition of data from a sporting event 101 and an event sensing step 104, comprising the detection of event records 105. This minimal embodiment detects gameplay events but without additional steps, does not augment video feed with overlay.

The data acquisition step 102 minimally comprises the acquisition of sporting event data 103, which itself comprises positional data, by collection, generation, transfer, or other means. Positional data, also referred to as tracking data or trajectory data, represents the location of a set of players, individuals participating in a sporting event, at a set of moments during the sporting event. Positional data can also include the position of other entities such as the ball. The sporting event 101 may be a match, game, training session, or other occurrence of gameplay. The particular moments during which positional data is acquired are referred to as timesteps or frames. In some embodiments, sporting event data 103 further comprises additional types of data, which can include video and/or metadata, to be described later. When describing subsequent steps, "sporting event data" 103 or the unqualified term "data" may refer to any part or the entirety of the data acquired during the data acquisition step 102.

The event sensing step 104 comprises the processing of sporting event data 103 for the purposes of detecting the occurrence of gameplay events. Gameplay events are observable actions during a sporting event at any level of analysis. Basic gameplay scenarios, such as corner kicks, goal kicks, and free kicks in association football, are events, as are higher level tactical behaviors such as off-ball supporting movements. For the purposes of the disclosure, events can include but are not limited to physical events, technical events, gameplay events, tactical events, and strategic events. When describing subsequent steps, the unqualified term "event" refers to a gameplay event. The event sensing step outputs event records 105, each describing the occurrence of one event and minimally comprising the type of event and the time of occurrence, which may be a single timestep or a duration between starting and ending timesteps. Event records may also be referred to as pattern records.

In some embodiments, a tactical camera creation step 106 constructs a virtual camera view such that the augmented video generated by the method will have the action more visible. The video produced by applying an appropriate view to each video frame is referred to as a tactical camera video 107, or alternatively as a virtual camera video or action camera video. In some embodiments, the tactical camera creation step 106 also includes the generation of additional homographies representing the mapping between the coordinate system of the tactical camera video 107 and the real-world playing surface coordinate system.

In some embodiments, the event sensing step 104 is followed by an overlay generation step 108, during which the homographies and event records 105 are used to draw graphical overlays on the video by means of mapping tracking data (of individuals identified by role in the event record) and spatial information contained in the event record to video coordinates by the homographies. Graphical overlays comprise graphical elements superimposed on the original video feed that illustrate, highlight, or emphasize some aspect of the gameplay and are also referred to as telestrations (in the case of these embodiments, automatic telestration). In embodiments in which the method includes a tactical camera creation step 106, the input video may be the tactical camera video 107 and the applied homographies are those referring to the tactical camera video; otherwise, it may be the video output by the data acquisition step 102 and the applied homographies are those referring to said video. The result of the overlay generation step is one or more augmented videos 109. An augmented video comprises a video of some subset of the sporting event during which one or more gameplay event occurs, with these gameplay events illustrated by means of overlay elements which may include circles, lines, arrows, text, or other visual elements automatically drawn on the video, and whose properties including location in the video are determined by the characteristics of the event, the positions of the individuals, and the homographies. In some embodiments, graphical overlays not only demonstrate actually occurring gameplay actions but also show potential or hypothetical actions such as missed opportunities for passes.

FIG. 2. illustrates the substeps of the data acquisition step 102, which in some embodiments further comprises a video capture step 201 which comprises the acquisition of video of the sporting event 101 during a period of time that overlaps with positional data timesteps. In some embodiments, video capture is accomplished by means of recording or transmission from one or more cameras. In some embodiments, video capture is accomplished by means of transfer of video from other sources by wired or wireless means. A more accurate sensing of the sport events can be provided with videos having higher resolutions, for example 720p or higher resolution videos (preferably 1080p or greater) are preferred.

In some embodiments, the data acquisition step 102 further comprises a homography estimation step 204 comprising the acquisition of one or more homographies 206. The homography estimation step may also be referred to as camera pose estimation. A homography is a mapping between two coordinate systems; in the context of this disclosure, it maps between the coordinate system of the real-world field of play or playing surface in physical units such as meters, and the coordinate system of video acquired during the data acquisition step 102, in units of pixels. In cases where the video is from a static perspective, only one homography is needed. In cases where the video is from a moving perspective, a homography is estimated for some subset of the frames of the video. In preferred embodiments, a homography is estimated for every frame.

In some embodiments, the data acquisition step comprises a series of computer vision steps 208. In some embodiments, the data acquisition step 102 further comprises a video capture step 201 during which video is collected to use as input for the computer vision tracking steps 208. Alternatively, or additionally, in some embodiments, the data acquisition step 102 comprises the collection of data from one or more third-party data providers, that is to say, the data acquisition step 102 may include the reception of data by means of wired or wireless communications, including by means of a data connection on the Internet.

In some embodiments, the computer vision steps 208 include several processing steps with the overall purpose of acquiring data from a sporting event. In a detection step 202, individuals are detected in video frames. This can be done with state-of-the-art people detection neural networks such as Faster R-CNN as known in the art, for example as described in Ren, He, Girshick, and Sun (2015; "Faster R-CNN: Towards Real-Time Object Detection with Region Proposal Networks"; arXiv:1506.01497). In a tracking step 203 the system associates individuals detected in one frame with players detected in subsequent frames. This can be done in several ways, in some embodiments using information on visual similarity and positional similarity, as known in the art, for example as described in Bergmann, Meinhardt, and Leal-Taixe (2019; "Tracking without bells and whistles"; arXiv:1903.05625). In a homography estimation step 204, the system estimates the camera pose, that is, the relationship or homography between the video coordinate system and the playing surface coordinate system and uses this homography 206 to project locations in video coordinates onto real-world playing surface coordinates. As previously mentioned, one or multiple homographies may be estimated depending on the embodiment. Homography estimation can be accomplished by methods known in the art including the one described in patent document EP2396767A2. Each homography 206 is represented as a matrix which when multiplied by a video coordinate location, returns a playing-surface coordinate location. Finally, a mapping step 205 applies the transformation represented by the homographies by matrix multiplication to the tracked detections in order to map them from video coordinates to playing surface coordinates and thereby generate positional data 207.

The event sensing step 104 is accomplished with a series of description steps 301 and a series of event detection steps 302, as illustrated in FIG. 3. The description steps 301 develop a high-level description of the gameplay of the sporting event, describing aspects not included in the output of the data acquisition step 102 (e.g. which players are available for a pass, the probability to score from the current position, etc.). The event detection steps 302 determine, based on this description, the event or events that are occurring in any timestep.

In some embodiments, the primary unit of analysis within the description steps 301 is a model. Models are algorithms that can provide one or more values describing the gameplay. Conceptually, the models create progressively richer and more semantic representations of the state of the game. The set of models may include heuristics or straightforward arithmetical computations, physics-based models, neural networks, or any other computational method or routine;

that is to say, the set of models is heterogenous. They can take as input any combination of sporting event data 103, and the outputs of other models. The output of a model can be a scalar, or a higher-dimensional array indexed by time, players, teams, space, or other indexing strategies. For example, in association football a simple model provides the score in the match, computed directly from input data as a running sum of the total number of goals scored, and it is a 2×N-element array indexed by two teams and N timesteps. A more complex model requiring tracking data calculates the pass availability of each player on offense without the ball, as known in the art, for example as described in Spearman, Basye, and Hotovy (2017; "Physics-Based Modeling of Pass Probabilities in Soccer"; MIT Sloan Sports Analytics Conference). The output of this model is indexed by player and timestep. In addition to the computational process, each model defines its inputs and any parameters that modulate its results. These parameters can then be adjusted to improve the performance of the disclosure or customize its output.

In some contexts, the term "variable" is used to refer to models. Because the typical meaning of "variable" implies the output of a model rather than the model, we prefer to use the term "model" in order to distinguish the algorithm or model from its output.

In some embodiments, the event detection steps 302 comprise the detection of gameplay events by comparison of outputs of one or more model graphs, with criteria in a pattern library. A pattern library, also called an event library or event type library, is a collection of entries referring to a specific type of pattern or event. Every entry, or pattern, in the pattern library describes the pattern corresponding to a type of gameplay event in terms of criteria defined over output values of a subset of models in the model graph. These entries can also be referred to as pattern definitions, event definitions, or event type definitions. The pattern library is populated as part of a method according to the present disclosure and/or prior to or during operation of a system according to the present disclosure, for example retrievable from a remote server and/or manually introducible by users like subject-matter experts. In some embodiments, entries in the pattern library also contain criteria for assigning roles to individuals involved in the gameplay event and a set of instructions for evaluating the criteria, referred to as a pattern matching operation. In some embodiments, these entries may include specific steps for determining spatial information such as relevant gameplay areas as a function of the data corresponding to the time of the event. In some embodiments, every entry in the pattern library further includes a set of models whose output is required for the pattern to be evaluated. In some embodiments, each entry also includes spatial models whose output is used, optionally with rules that determine on any given timestep whether the model is needed. For example, an entry may require in order to evaluate its criteria a model that outputs an estimated future trajectory of a ball in the sporting event, but this model output is only relevant during a pass (that is, when the ball is between the passer and receiver).

In some embodiments, the description steps 301 include the construction of graphs of models 304, 306. Model graphs are sometimes referred to as variable graphs. A model graph is a set of mathematical models or algorithms of any variety, possibly a heterogeneity of types of models, connected to each other by their dependency relations. That is, if the output of a model is required as an input to another, these models are connected in the graph. The models and their dependency relations form a directed graph. One or more models use as input the data acquired during the data acquisition step, and therefore form a start of the graph.

The model graph construction steps take advantage of these dependency relationships (input requirements) among the models to construct a directed graph. In some embodiments, the disclosure distinguishes two categories of models. Vector models are those models whose input takes a value along every frame of data. This includes trivially calculable models like player velocity, and more complex models such as the dynamic classification of players into roles and lines (defensive line, midfielders' line, forwards' line). On the other hand, many models, for example pitch control as described in Spearman (2016; "Quantifying pitch control"; OptaPro Analytics Forum), have a higher dimensionality than vector models because they take a value not only at each frame of the match but also for each location on the playing surface (calculated with a predetermined resolution that makes a trade off between accuracy and speed of the calculations, e.g. 100 vertical points×70 horizontal points evaluated on the playing field produces good results. Any resolution above 30 vertical points×15 horizontal points can produce reasonable results, although with less accuracy). These models that rely on this grid of the playing field are spatial models. An example spatial model is time-to-contact, the amount of time it would take a specific player to reach a specific location on the field. Evaluating this across all players for all points on the field creates an array of 22 players×100 vertical resolution×70 vertical resolution (for the previously mentioned preferred grid).

The two categories of models are distinguished due to their different computational requirements, and they are therefore treated differently in some embodiments by the model graph execution module. In some embodiments, all vector models are included in one vector model graph, whereas the spatial models are assembled into spatial model graphs only when they are needed, as determined by the event sensing substeps 104 described below.

In some embodiments, the event sensing step 104 comprises the substeps illustrated in FIG. 3. In this figure, steps are displayed indented when they are looped or repeated for each item in a set. First, a set of models 303 is used to construct a vector model graph 304. In some embodiments, only the minimum set of models is included, which is determined by collecting all the vector models required by all the patterns in the pattern library to be detected. In any case, the graph is constructed by iteratively joining each model to its corresponding dependency models with a directed edge. In this step, spatial models are skipped, as are vector models with spatial models as dependencies. This vector model graph is a subgraph of the hypothetical graph of all available vector and spatial models. Following the construction of the subgraph 304, it is evaluated 305. This is accomplished by traversing the model graph using a tree traversal algorithm that respects the dependency relationships; that is, one that guarantees no model is evaluated until its dependent inputs are already calculated. This could include breadth-first traversal or reversed postorder depth-first traversal. These algorithms are well-known and described for example in Morris (1979; "Traversing binary trees simply and cheaply"; Information Processing Letters). As each model is reached in the traversal of the graph, the model is evaluated. Model evaluation can entail a different procedure depending on the type of model. In some embodiments, models are evaluated by neural network inference, statistical inference, optimization, simulation, or random search (i.e., the Monte Carlo methods). The output of the models is stored for use in subsequent steps. In some embodiments, some models are evaluated in parallel in cases when the dependency relationships allow.

Following vector model graph evaluation 305, frames of the sporting event data 103 are looped over. In preferred embodiments, every frame is included in the loop, or sample; in other embodiments, some frames may be skipped for efficiency or other reasons. The impact of reducing the number of frames sampled depends on the framerate of the original data. For best results enough frames should be included to reach a sample framerate of at least two frames per second, although the true minimum depends on the models used in the respective embodiments and whether they are sensitive to small-scale fluctuations in the data.

In any case, at each frame in the sample a spatial model graph is constructed 306. The models to be included in the frame's spatial model graph are collected by passing the output of vector models and the sporting event data into the criteria of each entry to determine which models are required. In some embodiments, these models are assembled with identical models removed (which can happen for example in the case that two pattern library entries request the same model) and previously calculated models removed (thus, avoiding re-calculating vector models) and then iteratively constructed, in the same manner as with the vector model graph, into a frame-specific spatial model graph 306. Then, the graph is evaluated 307 in the same manner as the vector model graph, and the outputs accordingly stored.

In some embodiments, the event detection steps 302 follow the description steps 301 and occur within the loop over timesteps. That is, at every timestep sampled, the following steps are performed. For every entry in the pattern library, the criteria defined by the entry are evaluated 308 by the specified pattern matching operation. The most common pattern matching operation in some embodiments is a generic pattern matching operation. The generic pattern matching operation is capable of evaluating criteria referenced in the pattern library entry, referring to model outputs, and composing the criteria in a logical statement. The logical statements may contain equalities (representing specific values that must hold for the pattern to be matched), inequalities (representing ranges of values that must hold for the pattern to be matched), and logical operators AND, NOT, OR, and XOR (exclusive or), allowing other statements to be combined. The generic pattern matching operation also allows for criteria that reference model outputs that take a value for each individual. Pattern matching criteria specified by a pattern library entry can take the form of FOR ANY INDIVIDUAL MATCHING <SOME CRITERIA> or IF X OR MORE INDIVIDUALS MATCH <SOME CRITERIA>.

When the pattern matching step 308 finds a match, an event record is constructed 309. Event records 310 each identify one occurrence of an event with various attributes. In some embodiments, these comprise an event identifier or pattern identifier, which identifies the event or pattern type that occurred, the start and end times of the event as determined by the pattern matching operation, players that were involved in the event and their roles, and areas and real or hypothetical movements or actions that were part of the criteria evaluated by the pattern matching operation. These last elements, players, roles, areas, movements, and actions, are the constituent elements of the criteria used by the pattern matcher.

In some embodiments, event videos are included in some or all event records 310. These are created from one or more videos acquired during data acquisition and trimmed with respect to the start and end time specified in the event record 310. It is preferred to use an action camera video 107 for this purpose, in order to focus on the action.

Figure 4:
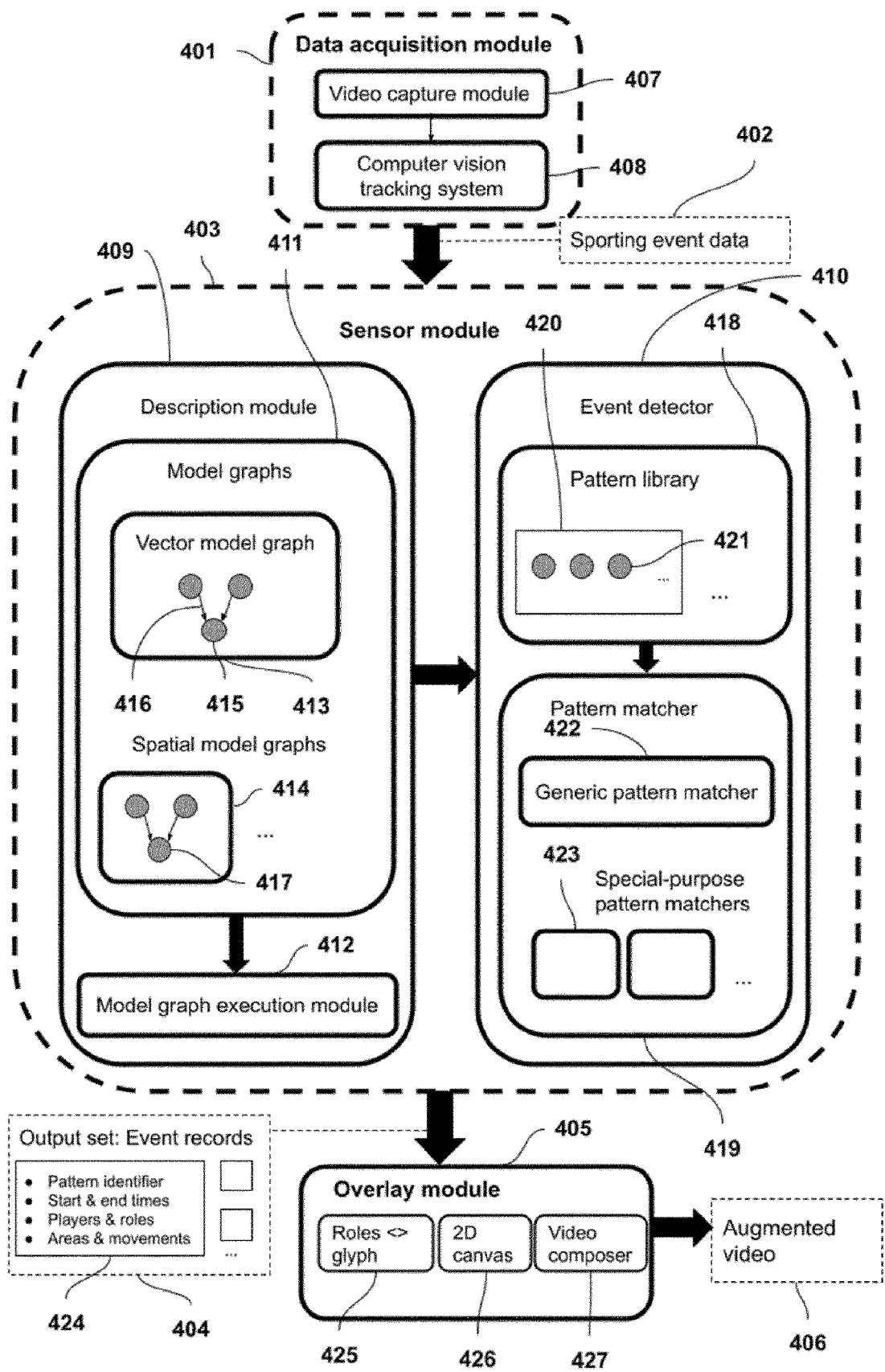
FIG. 4. Overall view of the computing system, the three general components (data acquisition module, sensor module, and overlay module), and the constituent modules of those components according to some embodiments of the disclosure.

As aforesaid, some embodiments relate to computing systems whose components, in some embodiments, are to execute the steps of the method described above. In this sense, the computing systems may include at least one processor, at least one memory, and a computer program stored in the at least one memory with instructions that, whenever run by the at least one processor, cause the computing system to execute the steps of the method described above. It will be noted that one or more processors of at least one processor, and one or more memories of the at least one memory may implement one, some or all modules as described, for example, with reference to FIG. 4. In this sense, multiple processors and/or multiple memories may implement the different modules without being part of a same computing device; in those cases, the computing system comprises two or more computing devices communicatively coupled via a wired or wireless connection.

Minimally, the system comprises a data acquisition module 401, configured to acquire sporting event data 402, and a sensor module 403, sometimes referred to as a performance sensor module, configured to detect events and generate an output set of event records 404. The system of this minimal embodiment senses gameplay events but without additional components, cannot augment video with overlay. Computing systems according to some preferred embodiments also include an overlay module 405 and are therefore able to generate augmented video 406.

The data acquisition module 401 is configured to acquire sporting event data 402 to be used by the subsequent modules. Minimally, the data acquired must include positional data. In some embodiments video, homographies, and/or metadata is also acquired. In some embodiments, data acquisition is via electronic transmission from an external source such as a database.

In some embodiments, the data acquisition module 401 includes a video capture module 407 responsible for collecting video to use as input for a computer vision tracking system 408. In some embodiments, the computer vision tracking system comprises a series of computer-implemented algorithms and models configured to execute the computer vision steps previously described 208. Alternatively, in some embodiments, the data acquisition module collects 401 data from one or more third-party data providers and provides it to the sensor module 403.

The requirements of the video capture module 407, in terms of collecting video sufficient for the computer vision tracking module, depends on a number of factors including camera location, lighting conditions, and other environmental factors. A configuration used by systems of some embodiments comprises three or more cameras, mounted together above the grandstands across from the centerline of the field, at least 5 m (20 m preferred) above the playing area, pointed toward the field such that the three or more cameras cover the entire surface. Other configurations may produce video sufficient for use with the subsequent modules of the disclosure. Systems according to some embodiments include a computing device for relaying the video feeds across wired or wireless connection for further processing.

The sensor module 403 is responsible for identifying the patterns or events occurring in the sporting event data 402. In some embodiments, this is accomplished with a description module 409 and an event detector 410, also referred to as an event detector module or an event detection module. The description module 409 is responsible for developing a high-level description of the state of the game. The event detector module 410 is responsible for determining, based on this description, the events that are occurring.

In some embodiments, the description module 409 comprises a representation of one or more model graphs 411, sometimes referred to as a variable graph module, and a model graph execution module 412, sometimes referred to as a variable graph execution module, configured to evaluate the model graphs as previously described.

In some embodiments, model graphs 411 comprises one or more (in preferred embodiments, only one) vector model graphs 413 and one or more (in preferred embodiments, one per frame sampled) spatial model graphs 414. Graphs are stored within the description module 409 or any connected storage medium, as directed graphs with every node representing a model 415 and every edge a dependency relation 416. Model X is said to depend on Model Y in the case that Model X requires as an input a value that is an output of Model Y. In the case of spatial model graphs 414, nodes 417 may be either spatial models or vector models (vector models can be included here in some embodiments; for example if a vector model has spatial model dependencies, it can only be evaluated in a spatial model graph).

In some embodiments, the graph execution module 412 is configured to traverse the graph as previously described and trigger a variety of computer-implemented model evaluation procedures, for each model retrieving from storage its required data from the data available and previous outputs of others models, executing the specified procedure, which may be stored locally or queried from a remote source, and store the model's output for future use.

In some embodiments, the event detection module 410 comprises a pattern library 418 and a pattern matcher module 419 configured to evaluate the criteria defined in the pattern library according to the description provided by the description module 409, using the method previously described, or a variant thereof. A pattern library is sometimes referred to as an event library or event type library.

In some embodiments, within the pattern library 418, each entry 420 represents one type of event or pattern to be detected and is stored along with basic metadata for display to the user, including name and categorization attributes. Additionally, each entry is associated with one or more models 421, indicating which values (model outputs) the criteria for the event will be compared against. Patterns in the pattern library may also determine the required models conditionally; this saves computational cost when this information is given to the model graph execution module 412. Typically, models are not needed during frames when the event is not applicable. For example, when gameplay is stopped, many events cannot occur, and therefore few models need to be evaluated. In some embodiments, patterns in the pattern library may also reference parameters, and in some embodiments also rules for inferring roles of sporting event participants and for identifying relevant locations and areas on the playing surface.

The pattern matching module 419 is configured to evaluate criteria in the pattern library 418 and contains one or more pattern matchers, a component implementing a specific method for matching pattern library entries. Specifically, pattern matchers match the gameplay descriptions from the description module with the events from the pattern library. Systems according to some embodiments contain one generic pattern matcher 422 and one or more special-purpose pattern matchers 423. The generic pattern matcher 422 is capable of evaluating criteria referenced in the pattern library according to the previously described generic pattern matching operation. Special-purpose pattern matchers 423 are configured to take into account other factors using different logic which can include patterns of model output values over time and other examples given below.

The sensor module 403 generates an output set 404 which comprises event records 424, as described previously. The output set may be digitally stored for future retrieval and/or directly transmitted to the overlay module 405.

Systems according to some embodiments comprise an overlay module 405, configured to augment a video feed within the sporting event data 402 with a partially transparent graphical overlay based on event records 424, generating augmented video 406. The overlay module is sometimes referred to as automatic telestration module. By a lookup table 425, the roles assigned to players and/or relevant areas in the event record map to specific individual visual elements, or glyphs. This lookup table is sometimes referred to as a telestration library. Circles, lines, arrows, and heatmaps are all types of glyphs used in some embodiments. For example, an event containing the action "pass" draws an arrow glyph between the player labeled with the role "passer" and the player labeled with the role "pass-target". In some embodiments there is support for higher-level glyph types such as "trajectory" which draws multiple line glyphs that together draw the trail of the player's movement over the course of the event. In some embodiments, for every video frame glyphs are drawn initially on a transparent 2D canvas 426 in field coordinates. This canvas is then transformed from field coordinates to video coordinates as defined by a homography from the sporting event data 401. The 2D canvas including the homography transformation is also referred to as a telestration potter. In some embodiments, the overlay module 405 further comprises a video composer 427, configured to combine images from transformed 2D canvases with the associated frame of the original video and then join such frames together to generate an augmented video 406. In some embodiments there is support for a variety of glyphs comprising player highlights, lines, arrows, and polygons (filled and unfilled).

Figure 9:
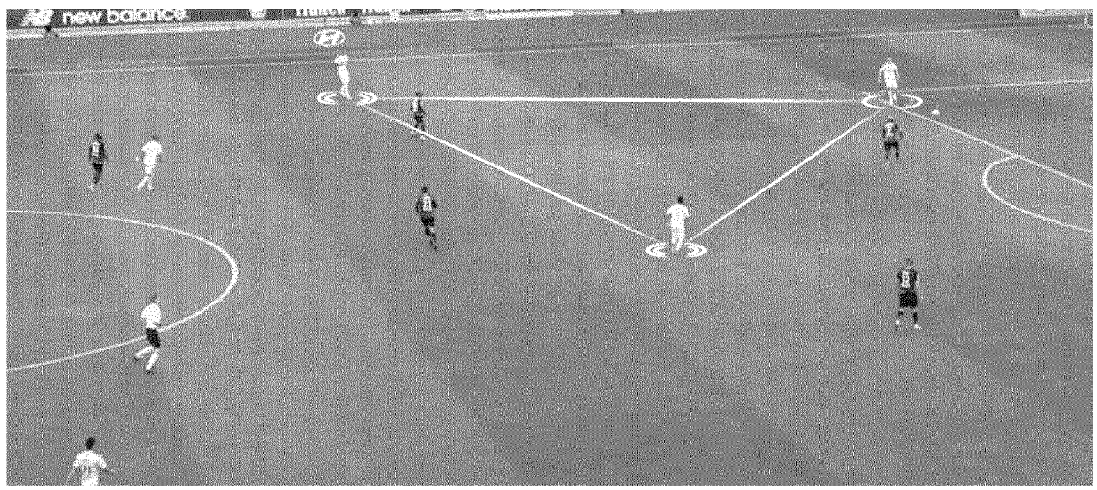
FIG. 9. An example frame from an event video with automatic overlay.

FIG. 9 shows an example frame from an augmented video, showing three players highlighted by circles and connected by lines.

Figure 5:
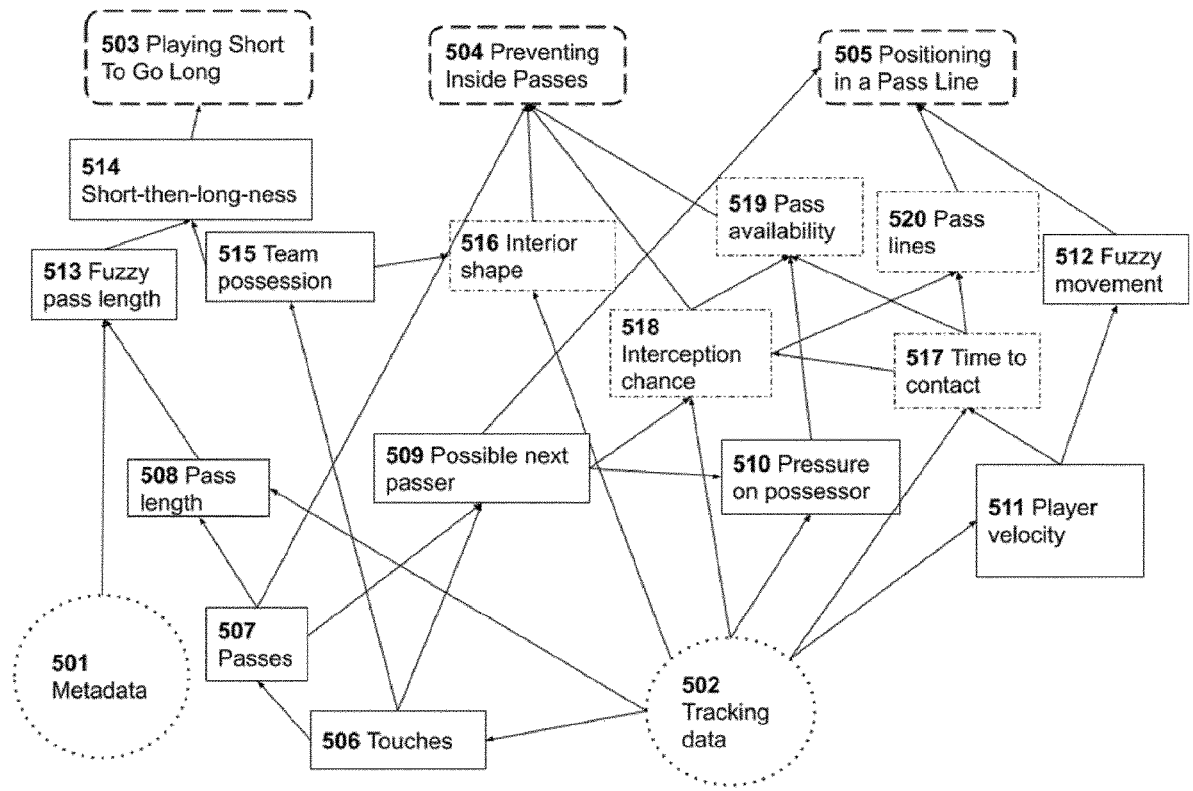
FIG. 5. A model graph and its relationships to other components according to some embodiments of the disclosure that detects three patterns.

FIG. 5 shows a model graph and its relationships to other components according to some embodiments that detect three patterns in association football (soccer). The circles "Tracking data" 501 and "Metadata" 502 refer to two previously defined constituents of sporting event data. The three rounded rectangles at the top refer to three entries in the pattern library 503, 504, 505. The rectangles in-between are the models in the model graph. The models with a dash-dotted outline are components of a spatial model graph, whereas the others are components of the vector model graph. They are shown in one diagram together for ease of illustration. Many of these take advantage of existing methods, whereas others are novel heuristics or machine learning models that any sports analytics expert could implement, in some cases with appropriate training data. Now we will describe each of the models in this example model graph.

In some embodiments there is a model that estimates touch events 506. These models are known in the prior art, for example the method described by Vidal-Codina (2021, "Automatic event detection in football using tracking data", MIT Sports Summit 2021) which requires tracking data of players plus the ball.

In some embodiments there is a model that estimates passes 507. This can be done using a heuristic such as detecting a pass when two consecutive touches occur between different players on the same team. Some embodiments further compute pass length 508 computed using the Euclidean distance between the two locations at which passes were detected.

In some embodiments there is a model that outputs the possible next passer 509. This is a heuristic that outputs the player who made the last touch, except for time steps when a pass is in progress, in which case it outputs the player who will receive the pass. This output serves to represent the player who will have the next opportunity to make a pass. By looking ahead to the receiver of a pass, the model can better account for one-touch passes.

In some embodiments there is a model outputting pressure on the possessor 510, which can be computed using the algorithm published in Andrienko, Adrienko, Budziak, von Landesberger, and Weber (2017; "Exploring pressure in football"; doi:10.1145/3206505.3206558). This is a vector variable taking a value for every frame of the match (although, it takes a null value when there is no possessor).

In some embodiments, player velocity is calculated by a model 511 that applies Euclidean distance across player locations in consecutive timesteps. In some embodiments filtering is applied to avoid spikes in velocity associated with errors in the tracking data. In some embodiments, a model of fuzzy movement 512 is applied to player velocities, classifying each into locomotor categories (e.g. walking, jogging, running), mapping each player's velocity onto a scale from 0% to 100% representing to what extent it is accurate to say the player is in each category. Considering that the tracking data rarely shows a player with exactly zero velocity, a fuzzy model is appropriate. Appropriate thresholds and other parameters are known in the prior art, such as Dwyer and Gabbett (2012, "Global Positioning System Data Analysis: Velocity Ranges and a New Definition of Sprinting for Field Sport Athletes", doi:10.1519/JSC.0b013e3182276555).

In some embodiments there is a model named "fuzzy pass length" 513, which uses similar logic as fuzzy movement but applied to pass lengths. This model has two components, "shortness" and "longness" which take values from zero to one. These are calculated first by scaling observed pass length to the size of the pitch (pitch size being one of the values in the metadata, in some embodiments) such that the effective pass length is longer on smaller pitches. Then, shortness and longness are calculated as piecewise linear functions taking two parameters each. When pass length is less than the lesser shortness parameter, shortness is equal to 1. When pass length is greater than the greater shortness parameter, shortness is equal to 0. For longness, the parameters have the opposite effect. The parameters need not be symmetric and therefore the resulting values are not necessarily complementary. That is, a medium-length pass could have values of shortness=0.5 and longness=0.5 (complementary), or it could very well have shortness=0.1 and longness=0.4 (not complementary), depending on the parameter values. However, in preferred embodiments, a symmetric parameter set with equal zero-points for shortness and longness, in order to simplify parameter fitting, is used. The preferred parameter values were chosen comparing the results to those produced by football experts reviewing gameplay footage for the patterns using this variable (e.g., Playing Short To Go Long, described below). Preferred values are such that shortness=1 at scaled pass length=10, shortness=0 at scaled pass length=15 m, longness=0 at scaled pass length=15 m, and longness=1 at scaled pass length=30 m. Whether any particular parameter combination produces reasonable results is a matter of all four parameters; therefore reasonable ranges cannot be given. In general these values can be scaled up to 25% in either direction on their own or up to 50% if the adjustments are made with coordination of all four parameters.

In some embodiments, fuzzy models such as the ones described above are optimized to fit expert-labeled datasets using the known technique of genetic fuzzy trees (see Cordon, Hoffman, Magdalena and Herrera; 2001; "Genetic Fuzzy Systems: Evolutionary Tuning and Learning of Fuzzy Knowledge Bases", DOI: 10.1142/4177).

Another model in some embodiments, short-then-longness 514, is the multiplication of the shortness values of one or more passes with the longness value of the next pass. Constraints are applied to which sequences of passes are considered: they must be from the same team, without losing possession in-between. This is an example of a model included in order to support one pattern in particular; in this case Playing Short To Go Long 503, which is described below in more detail.

In some embodiments there is a model that outputs team possession 515. A minimal model of team possession outputs the team of the last touch. In other embodiments, a possession is only awarded after two consecutive touches by the same team; if a team touches only once before the other team touches the ball, then this period of time is output as undetermined possession.

In some embodiments, there is a model that outputs interior shape 510, the inner region of the pitch protected by the defense that the offense is trying to enter, is computed using the alpha shape algorithm described in Akkiraju, Edelsbrunner, Facello, Fu, Mucke, and Varela (1995; "Alpha shapes: definition and software"). In preferred embodiments values of alpha ranging between 0.3 and 0.7, although preferably within the 0.35 and 0.65 range, are used. Interior space is included in some spatial model graphs in some embodiments.

In some embodiments, time-to-contact is computed using a model 517 that outputs the time it would take for each player to reach any point in the playing area. In preferred embodiments, it is included only in spatial model graphs because it is calculated for any potential pass target location. In some embodiments, the method described in Spearman, Basye, and Hotovy (2017; "Physics-Based Modeling of Pass Probabilities in Soccer"; MIT Sloan Sports Analytics Conference), where the same concept is called "time-to-intercept", is used. In preferred embodiments, it is included only in spatial model graphs because it is calculated across all points in the surface area (as potential target locations).

In some embodiments, there is a model that outputs interception chance 518, using known methods such as the one described in Spearman, Basye, and Hotovy (2017; "Physics-Based Modeling of Pass Probabilities in Soccer"; MIT Sloan Sports Analytics Conference), which combines the time to contact of all opponents probabilistically. Interception chance is the probability that any particular pass could be intercepted by any opponent.

In some embodiments, pass availability 518 is computed using a physics-based model similar to that of Spearman, Basye, and Hotovy (2017; "Physics-Based Modeling of Pass Probabilities in Soccer"; MIT Sloan Sports Analytics Conference), with interception chance 518 and time-to-contact 517 as intermediate variables calculated as submodels in the cited method. In some embodiments, the Spearman method, for example by including pressure on the possessor 510 as a requirement for pass availability such that as pressure increases, pass availability decreases, is used. Pass availability 519, interception chance 518, and time-to-contact

517 compute a value for each teammate of the possessor, at each frame in the sample, and therefore in some embodiments are included in some spatial model graphs rather than the vector model graph.

Another example model in some spatial model graphs, pass lines 520, describes whether players are available for a pass on a pass line. It is calculated using the same algorithm as pass availability 519, with the additional constraint that all players on the possessing team do not move. Rather than describing whether the potential receiver can move to the pass line, it asks whether they are already positioned on a pass line. Thus, the combination of a previously known model with a simple heuristic provides a novel model output that can be used to match patterns.

Figure 6:
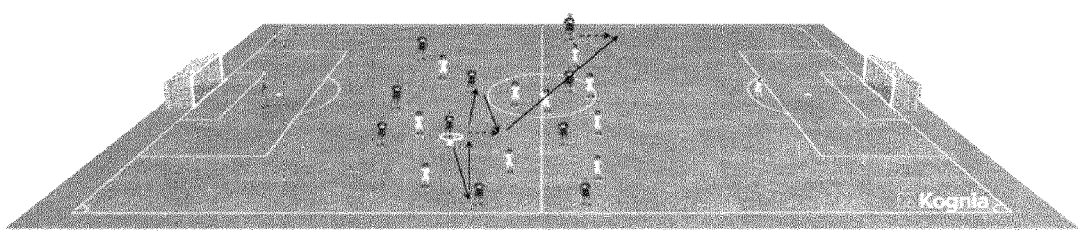
FIG. 6. An illustration of the event Playing Short To Go Long.

Playing Short To Go Long 503 is a tactical event detected in some embodiments describing the execution of a long pass that follows one or more short passes. It is executed in order to draw in defenders, creating space in a more distant area of the pitch, which can then be attacked with a long pass, as illustrated in FIG. 6. This event has one directly required model, short-then-longness 514, which itself has two required models: fuzzy pass length 513, and team possession 515. These models have yet more dependencies, which are illustrated in FIG. 5. Any sequence of passes with short-then-longness 514 above a predefined threshold is detected as an occurrence of this event. In the case that overlapping sequences are detected, the one with the most short passes is kept and the others are discarded. For example, given the sequence Short_1, Short_2, Short_3, Long_4, the criteria would first detect three sequences: one with two passes, one with three, and another with all four. Then, the system would discard all but the longest one (and in the method all would be discarded but the longest one). In addition to the parameters already described for the models involved, this event adds one additional parameter: an overall detection threshold. This determines the minimum criterion of the value of short-then-longness. In preferred embodiments a value of 50% is used, although values from 30% to 85% produce reasonable results. This criterion can be adjusted to detect more or less occurrences of this event. For example, in some use cases of the method and/or system, it may be beneficial to highlight only the most extreme occurrences.

Figure 7:
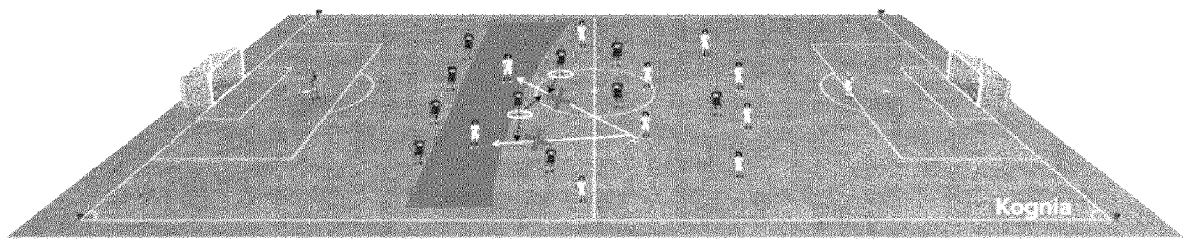
FIG. 7. An illustration of the event Preventing Inside passes.

In some embodiments, the method and/or system detects a tactical event named Preventing Inside Passes 504. This event captures the ability of midfielders to adjust their position when the opponent has possession in order to reduce the opportunity for the opponent to make passes that penetrate the interior space, as illustrated in FIG. 7. To detect this event, several models in the model graph, an entry in the pattern library, and a temporal sequence pattern matcher, are used in some embodiments. The entry in the pattern library defines the criteria sets as follows. First, an opponent player must be available for a pass (as measured by the pass availability output 519) while positioned in an interior space 516 (with minimum pass availability defined below). Then, the interception chance 518 for a pass attempt to this player must increase by a certain amount (defined below), with no other opponent becoming available for a pass in an interior space to an even greater degree. Finally, the player originally open for a pass must not actually receive a pass. The above criteria refer to three models, including pass availability 519, interior space 516, and interception chance 518. These three models were described previously. The Prevent Inside Passes event has four parameters. By adjusting the parameters, the detection of this event becomes more or less sensitive. Values used in preferred embodiments are chosen by maximizing the agreement to the judgment of a panel of expert coaches. One parameter is the minimum pass availability that meets the first criteria set. Values between 60% and 90% produce reasonable results while a value of 75% results in the highest level of accuracy. The second parameter is the minimum interception chance increase. Here, a value of 30% is preferred with values between 10% and 50% producing reasonable results. The third parameter and fourth parameters define the sequence time of the temporal sequence pattern matcher. The preferred minimum sequence time is zero seconds (meaning that as long as the criteria are met, the sequence can happen very quickly with the event still being detected) although a value up to 2 seconds produces reasonable results. Finally, the preferred maximum sequence time is 5 seconds with values between 2 seconds and 15 seconds producing reasonable results.

Figure 8:
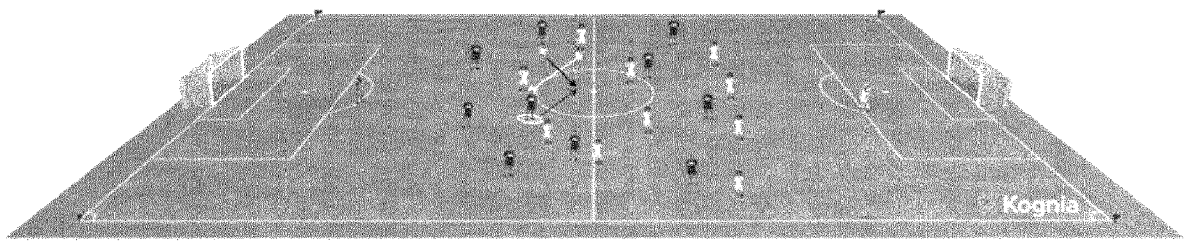
FIG. 8. An illustration of the event Positioning in a Pass Line.

In some embodiments, the method and/or system detects a tactical event named Positioning in a Pass Line 505. This event captures the ability of players to make movements that put them in an opportune position to receive a pass when one of their teammates has possession, as illustrated in FIG. 8. This event represents a movement a player makes specifically for the purpose of getting open on a pass line. In other words, it should capture a sequence where the player is not on a pass line, then they move, then they are on a pass line. To detect this event, several models in the model graph, an entry in the pattern library, and a temporal sequence pattern matcher are used in the embodiment. The entry in the pattern library defines the criteria sets as follows. First, a player whose teammate is the possible next passer is not on a pass line as defined by the pass line mode 520. Then, they make a running movement as defined by the fuzzy movement model 512. Then, they must be on a pass line. This must happen without the possible next passer 509 changing in the meantime. The Positioning in a Pass Line Pattern has six parameters. By adjusting the parameters, the detection of this event becomes more or less sensitive. Values used in preferred embodiments are chosen by maximizing the agreement to the judgment of a panel of expert coaches. The first parameter is the maximum value of the pass line probability during the first phase of the sequence. A value of 40% is preferred but between 20% and 60% produces reasonable results. Then there are parameters related to the movement in the second phase. One of these is the minimum value of the fuzzy movement model output. A value of 90% is preferred but from 80% to 95% produces reasonable results. Another is the minimum length of the movement. Here, a value of 1 meter is preferred but between 0 meters (the movement criteria then relying only on the player movement model) and 5 meters is reasonable. Then, there is the minimum of pass line during the final phase of the sequence. Here, 75% produces good results but between 60% and 90% is reasonable. Finally, there are the two parameters of the temporal sequence pattern matcher. The preferred minimum sequence time is 2 seconds although a value between 0 and 5 seconds produces reasonable results. Finally, the preferred maximum sequence time is 5 seconds with values between 2 seconds and 15 seconds producing reasonable results.

In the following paragraphs, additional specifications are described which go beyond what is specified in the figures. In some embodiments, the data acquisition step 102 further comprises the acquisition of metadata. Metadata describes any characteristic of the sporting event 101 or its participants that may be known by any means prior to observation of the sporting event (e.g., performance characteristics of the participants during previous sporting events). This may include information on the teams, players, and the sporting event 101 itself, such as the date, location, and competition. Some of this data is, in some embodiments, included in event records 105 to identify individuals involved in each event. Some of the metadata is, in some embodiments, used in the event sensing step 104, such as the dimensions of the playing surface, as this can affect the events detected. Specifically, models evaluated during the event sensing step 104 may require certain pieces of metadata.

The tactical camera creation step 106 is accomplished by adjusting the zoom, pan, and/or perspective of a virtual camera during the sporting event according to a predetermined ruleset or algorithm. Multiple methods of tactical camera creation are known, such as that described in patent WO2015151095A1 or by detecting area of interest as described in patent WO2019141813A1 and following said area with the camera perspective. The ruleset may vary according to the type of video desired. A coach may prefer a view that maximizes the number of players visible; spectators may prefer a view that zooms closer to the action. In embodiments comprising more than one camera, the action camera module may construct its videos by stitching together different pieces of the video feeds of the different cameras, using known methods such as those described in U.S. Pat. No. 8,698,874.

In some embodiments, the data acquisition step includes a homography estimation step 204 but does not include other computer vision steps. This is the case when positional data 207 is acquired by transfer from a third-party or other external source but said source does not provide homographies; in this case, homographies must be estimated to provide to the overlay generation step 108.

In some embodiments, special-purpose pattern matching operations are used in the pattern matching step 308, comprising other methods besides the method of the generic pattern matching operation described previously. These special-purpose pattern matching operations may be specific to an event type or useful for multiple event types. For example, the temporal sequence pattern matching procedure is a special-purpose pattern matching operation used in some embodiments. Whereas the generic pattern matching procedure checks the criteria at particular moments, the temporal sequence pattern matching procedure checks different criteria at different moments. That is, it is capable of matching events in the pattern library defined with the form "First criteria set A must occur, then criteria set B must occur, then criteria set C must occur". The criteria sets themselves are the same as those used by the generic pattern matching procedure, but the temporal sequence pattern matching procedure allows for multiple criteria sets to be checked in a sequence. The criteria sets are joined with a logical AND operation such that if even one does not occur, the event is not matched. Each entry in the pattern library that uses the temporal sequence pattern matching procedure can specify different sequence time minimums and maximums defining the duration of the time window during which the sequence must occur.

The invention claimed is:

1. A computing system, comprising: a data acquisition module and a sensor module; wherein:
   a. the data acquisition module comprises a video capture module and computer vision tracking system,
      i. the video capture module is configured to receive or capture video footage from a sporting event, and
      ii. the computer vision module is configured to digitally process the video footage to produce trajectories of players in the video and a homography mapping between video coordinates and area-of-play coordinates, and comprises a detection module, a tracking module, and a homography estimation module,
         1. the detection module is configured to detect players in each frame of the video, and
         2. the tracking module is configured to associate detected players from one frame to the next, and
         3. the homography estimation module is configured to estimate a mapping of video coordinates to area-of-play coordinates;
   b. the sensor module is configured to digitally process data from the data acquisition module and output event records, and comprises a description module and an event detector module,
      i. the description module is configured to evaluate a collection of computer-implemented models, with each model taking as input at least one of the positional data determined by the data acquisition module, and the output of one or more other models from the collection,
      ii. the event detector comprises a pattern library and a pattern matcher module,
         1. the pattern library contains pattern definitions, each containing
            a. one rule defining the conditions, in terms of inequality relationships defined over outputs from the model graph, during which the pattern should be considered matched, and
            b. zero or more additional rules, each mapped from a player role, in terms of outputs from the model graph, determining when a player is considered as fulfilling that rule, and
            c. a mapping of player roles to glyph specifications, where glyphs are visual elements, and
         2. the pattern matcher module is configured to evaluate rules from the pattern library in the form of inequalities over the model outputs, and
      iii. the event detector is configured to produce event records that include start and end times of the matched event determined by the first to the last frame at which the event's pattern in the pattern library was matched, and one or more player role assignments, determined by applying the rule associated with each player role as specified by the entry in the pattern library.

2. The computing system of claim 1, further comprising an overlay module configured to augment the original video using the positions of the player in each role of the event record, looking up the glyph associated with each role, applying to each glyph the reverse of the homography transformation estimated by the data acquisition module, and drawing all the glyphs of the event record over the relevant frames of the original video, relevant frames being from the start to the end timestep of each event record.

3. A computing system, comprising: at least one processor, and at least one memory; the at least one memory comprising: a collection of models associated with a sporting event, a pattern library with pattern definitions associated with the sporting event, and instructions which, when executed by the at least one processor, cause the computing system to at least perform the following:
   digitally process video footage from the sporting event such that the digital processing:
   registers coordinates of the video footage and estimates coordinates of an area-of-play of the sporting event as appearing in the video footage, and thereby provides a homography mapping between both coordinates; and detects players in each frame of the video footage, associates the detected players between adjacent frames, and uses both the associated detection of the players and the homography mapping to output a dataset with at least one of positional data of the players and trajectories of the players;

digitally process the collection of models such that the digital processing:

constructs a vector model graph with the models in the collection;

inputs at least part of the dataset into the vector model graph for evaluation thereof;

constructs, based on the evaluated vector model graph, a subset of spatial models into a graph for each group of N frames of the video footage, with the video footage at least comprising N frames; and inputs at least part of the dataset into the graph of the subset of spatial models for evaluation thereof, thereby providing spatial model evaluation outputs;

digitally process the pattern definitions such that the digital processing:

compares each pattern definition with each spatial model evaluation output; and outputs an event record for each spatial model evaluation output that fulfills the pattern definition, the event record including data at least indicative of an event of the pattern definition, and start and end times that the pattern definition is fulfilled according to respective start and end frames of the video footage;

wherein each pattern definition of the pattern library includes data at least indicative of a rule defining conditions in terms of inequality relationships defined over outputs from a model graph.

4. The computing system of claim 3, wherein the data of each pattern definition is at least further indicative of:

one or more rules mapped from a role of the players of the sporting event, each rule defining at least one condition in terms of outputs from the model graph for determining fulfillment of the rule by the player; and a mapping of player roles to glyph specifications, where glyphs are visual elements in the video footage;

wherein the data of the event record is at least further indicative of one or more player role assignments according to the fulfillment of the one or more rules of the pattern definition.

5. The computing system of claim 4, wherein the video footage is a first video footage, and wherein the instructions further cause the computing system to at least perform: digitally process the first video footage such that the digital processing outputs second video footage comprising the first video footage with glyphs digitally added thereto, wherein the glyphs are at least added in the video footage according to one or more pattern definitions that are fulfilled, the glyphs being added between respective start and end frames of the pattern definition that is fulfilled and on the player or players in the player role assignment or assignments indicated on the event record, wherein the glyphs are determined by the mapping of player roles to glyph specifications, and wherein the digital processing adds the glyphs in the video footage by applying a reverse of the homography mapping.

6. The computing system of claim 3, further comprising at least one of: a video camera configured to capture the video footage, and a communications module configured to receive the video footage from a computing device or a video camera.

7. The computing system of claim 3, wherein digitally processing the video footage from the sporting event to provide the homography mapping and the dataset comprises at least one of:

digitally processing two or more video footages of the same sporting event captured with different perspectives, the two or more video footages comprising the video footage; and digitally processing the video footage and measurements of one or more position measuring sensors when arranged on at least some players of the sporting event;

wherein the at least one of the two or more video footages and the measurements are digitally processed to provide the homography mapping and the dataset.

8. The computing system of claim 7, further comprising at least one of: a plurality of video cameras adapted to capture the two or more video footages, and the one or more positions measuring sensors.

9. The computing system of claim 3, wherein the models of the collection are linked by input-output dependency relationships, with at least one model of the collection taking as input positional data of players of the sporting event.

10. The computing system of claim 9, wherein the collection of models is represented as a directed acyclic graph, with both each model being a node in the graph and each edge in the graph representing a dependency relationship pointing from one model to another model whose output is required as an input to the first model.

11. The computing system of claim 10, wherein the digital processing of the collection of models is such that the digital processing evaluates the collection of models by:

traversing the directed acyclic graph of models in depth-first order, and reversing the resulting order such that the model traversed last is evaluated first, the model traversed first is evaluated last.

12. The computing system of claim 10, wherein the models are classified in two categories: vector models configured to evaluate all timesteps of a sample of the sporting event simultaneously, and spatial models that are executed timestep-by-timestep; wherein the digital processing of the collection of models is such that the digital processing further:

evaluates the directed acyclic graph of the subset of the models that are vector models;

evaluates, at each timestep during the timestep-by-timestep evaluation of pattern definitions of the pattern library, whether an event is potentially active or not during said timestep according to a comparison parameter included in a respective pattern definition;

adds, in case the evaluation indicates that the event is potentially active, one or more spatial models defined in a respective pattern definition to a collection of spatial models for the respective timestep;

constructs a directed acyclic graph of models based on both all the spatial models and dependencies thereof, evaluates the spatial models in the directed acyclic graph of models respecting the dependencies thereof, thereby providing the spatial model evaluation outputs.

13. A computer-implemented method, comprising:

a data acquisition step and an event sensing step;

wherein the data acquisition step comprises the acquisition, by one or more of video, position-measuring sensors, or digital transfer, a set of sporting event data including the positions of individuals during a time span thereof;

wherein the event sensing step comprises a description step and an event detection step, wherein the description step comprises evaluating a model graph, comprising a collection of models linked by input-output dependency relationships, with at least one model taking as input at least part of the sporting event data, and storing by digital means of the model outputs, which together provide a high-level description of the gameplay; and wherein the event detection step comprises matching of the gameplay description with patterns representing event types from a pattern library, outputting an event record whenever a match is found;

wherein the event detection step further comprises comparing, for every timestep in a sample of the sporting event data, and for every event in a predetermined library containing pattern definitions, the model outputs at that timestep to the criteria in the pattern definition using pattern matching criteria comprising at least one inequality relationships defined with reference to model outputs, and in case a match is found, creating an event record including the timestep at which it matches, as the start time of the event, and reevaluating any matches that have been found in previous timesteps, and adding, upon reaching the first timestep when the match conditions do not hold true, the previous timestep to the event record as the ending time of the event.

14. A computer-implemented method of claim 13, further comprising the steps of:

representing the collection of models as a directed acyclic graph, each model is a node in the graph, and each edge in the graph represents a dependency relationship pointing from one model to another model whose output is required as an input to the first model, and evaluating the models in an order respecting their dependency relationships.

15. The computer-implemented method of claim 14, wherein the order of evaluation of the models is determined by:

traversing the directed acyclic graph of models in depth-first order, reversing the resulting order such that the model traversed last is evaluated first, the model traversed first is evaluated last.

16. The computer-implemented method of claim 14, wherein the models are classified in two categories vector models configured to evaluate all timesteps of a sample of the sporting event simultaneously, and spatial models that are executed timestep-by-timestep;

wherein the method further comprises the evaluation of a directed acyclic graph of the subset of the models that are vector models;

following which, at each timestep during the timestep-by-timestep evaluation of the pattern definitions:

a subset of spatial events is collected, by the following means: for each pattern definition, an additional comparison included in the definition determines whether the event is potentially active or not during the current timestep, and in case the event is potentially active, one or more spatial models defined in the pattern definition is added to the collection for the current timestep, and then a directed acyclic graph of models is constructed including all the spatial models collected in the previous step and all their dependencies, the spatial models in said graph are evaluated in an order respecting their dependency relationships, and then the output of the spatial models at each timestep together with the vector model outputs are used for the subsequent event matching steps.

17. A computer-implemented method, the method comprising:

a data acquisition step and an event sensing step;

wherein the data acquisition step comprises the acquisition, by one or more of video, position-measuring sensors, or digital transfer, a set of sporting event data including the positions of individuals during a time span thereof;

wherein the event sensing step comprises a description step and an event detection step, wherein the description step comprises a first sub step of evaluating a model graph, comprising a collection of models linked by input-output dependency relationships, with at least one model taking as input at least part of the sporting event data, and a second substep of storing by digital means of the model outputs, a combination of the first substep and the second substep providing a high-level description of the gameplay; and wherein the event detection step comprises matching of the gameplay description with patterns representing event types from a pattern library, and outputting an event record whenever a match is found;

further comprising, prior to the data acquisition step:

receiving or capturing video of the sporting event in high-definition resolution of at least 720p, and capturing a subset or the entirety of an area of play, and further comprising a series of computer vision processing steps including detecting players in some or all frames of the video;

tracking the detected people across frames;

estimating the homography relationship between the coordinate system of the video and that of the area of play;

applying homography transformation, using matrix multiplication, at each frame with detected players, to transform the detections in video coordinates into area-of-play coordinates, providing the positions of the individuals and trajectories of the players in the area of play.

18. The computer-implemented method of claim 17, further comprising as an initial step of video capture of the sporting event with one or more cameras, together capturing a subset or the entirety of the area of play.

19. The computer-implemented method of claim 17, further comprising:

a. the pattern library includes, for each event:

i. rules for assigning roles to players during the event, using the same criteria for matching events (e.g., inequalities defined over model output values, in this case referring to models with different outputs per player), and when an event is matched, these rules are checked and thereby player roles assignments are included in the resulting event record, and ii. a mapping of player roles to glyph specifications, wherein glyphs are visual elements;

b. overlay generation steps are performed subsequent to the event matching step, comprising:
  i. for each timestep from the start to the end time of the event:
  a fully transparent image is created, and for each player role identified in the event record,
    a. the position of the player in that frame is retrieved from the positional data, and
    b. the glyph associated with each players' role is drawn over the transparent image, and the inverse of the homography transformation is applied over the resulting partially transparent image, using matrix multiplication, transforming it from area-of-play coordinates to video coordinates, and
  the resulting partially transparent image is overlaid with the frame from the original video;
  ii. all the frames are joined into a video.

\* \* \* \* \*